United States Patent [19]

Taplin

[11] Patent Number: 4,502,708
[45] Date of Patent: Mar. 5, 1985

[54] POWER TRANSMISSION

[75] Inventor: Lael B. Taplin, Union Lake, Mich.

[73] Assignee: Vickers, Incorporated, Troy, Mich.

[21] Appl. No.: 359,288

[22] Filed: Mar. 18, 1982

[51] Int. Cl.³ .............................................. B62D 37/04
[52] U.S. Cl. .................................. 280/755; 212/154; 280/6 H
[58] Field of Search ............... 280/757, 758, 755, 6 H, 280/6 R, 772, 6.1; 180/290, 41, 282; 414/699, 700; 212/154 X, 149, 156

[56] References Cited

U.S. PATENT DOCUMENTS 3,893,680  7/1975  Marcillat ............................ 280/6 H
4,340,235  7/1982  Thompson .......................... 280/6 H

FOREIGN PATENT DOCUMENTS 0114114 10/1978  Japan .................................. 180/290
536997  12/1976  U.S.S.R. ............................. 280/758

Primary Examiner—David M. Mitchell
Assistant Examiner—Joseph G. McCarthy
Attorney, Agent, or Firm—Barnes, Kisselle, Raisch, Choate, Whittemore & Hulbert

[57] ABSTRACT

A stabilizing system for a wheeled vehicle having a movable mass on the vehicle, an actuator mounted on the vehicle connected to the mass for moving the mass, a sensor mounted on the vehicle for sensing movement of the vehicle about an axis to be stabilized, and a controller responsive to the sensor for controlling the actuator to cause movement of the movable mass in the same direction about the axis to be stabilized as the direction which the sensor is sensing movement of the vehicle and, in turn, the mass.

15 Claims, 8 Drawing Figures

POWER TRANSMISSION

This invention relates to power transmission and particularly to a stabilizing system for wheeled vehicles.

BACKGROUND AND SUMMARY OF THE INVENTION

In large mobile construction equipment, the vehicle is unsprung except for air filled tires and on uneven terrain a pitching motion produces an instability when moving between work stations or job sites. The pitching instability may be sufficiently violent that it causes the operator to reduce the ground speed of the vehicle thereby adversely affecting productivity.

Accordingly, among the objectives of the present invention are to provide a method and apparatus for stabilizing the vehicle so that the operator need not slow down the vehicle.

In accordance with the invention, the stabilizing system for a wheeled vehicle having a movable mass on the vehicle, an actuator mounted on the vehicle and connected to the mass for moving the mass, a sensor mounted on the vehicle for sensing movement of the vehicle about an axis to be stabilized, and a controller responsive to the sensor for controlling the actuator to cause movement of the movable mass in the same direction about the axis to be stabilized as the direction which the sensor is sensing movement of the vehicle and, in turn, the mass.

DESCRIPTION

Figure 1:
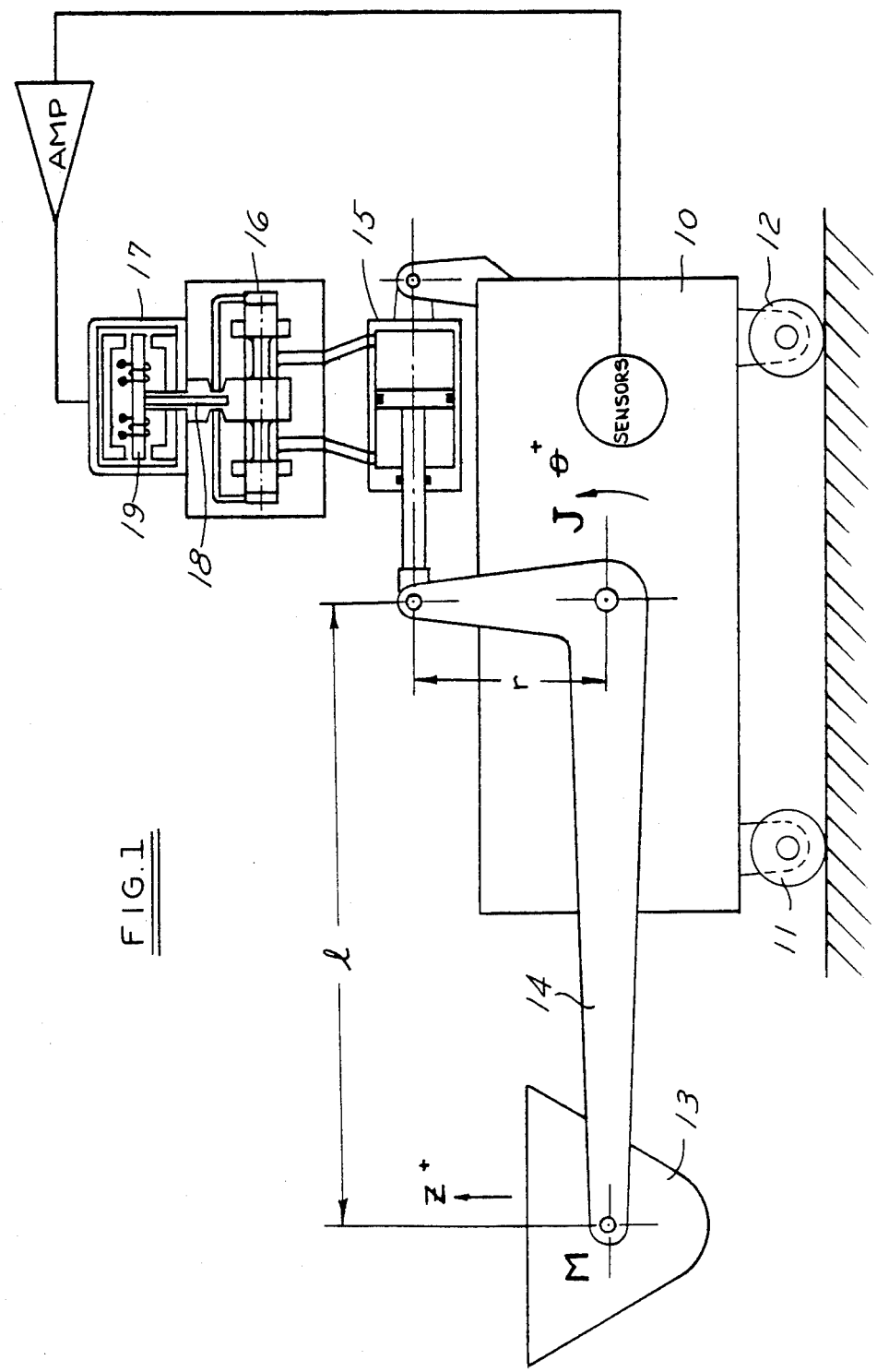
FIG. 1 is a schematic view of a vehicle embodying the invention.

Referring to FIG. 1, a mobile construction vehicle 10 is diagrammatically shown which is unsprung, that is, does not utilize a suspension system except for air filled tires which are shown diagrammatically at 11 and 12. The vehicle is adapted to be moved along the ground and includes implements that are movable relative to the frame defining a mass M such as a bucket 13 pivoted to a boom or arm 14 and movable by an actuator 15, herein shown as a linear hydraulic cylinder. The operation of the cylinder is conventionally controlled by a servo valve 16 that is electrically controlled by an electrical servo controller valve 17 such as a flapper type 18 operated by coils 19.

When the vehicle is moving along the ground between work stations or between job sites, there is a tendency of pitch instability about the center of gravity C.G. and this may be sufficiently violent that it causes the operator to slow down the vehicle movement and adversely affect productivity.

Figure 2:
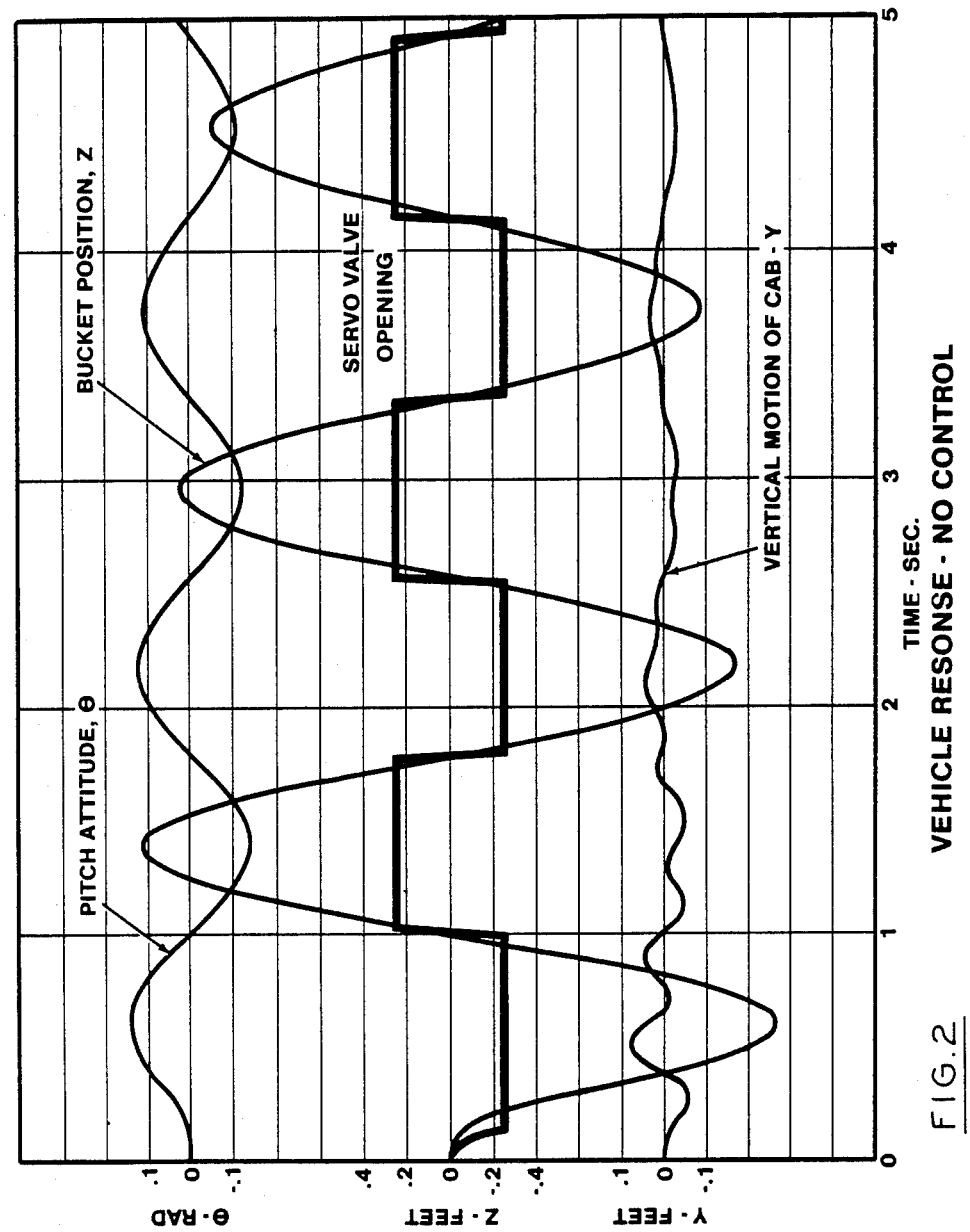
FIG. 2 is a graph of vertical motion versus vehicle response in a system that does not utilize the invention.

The vehicle response in such an arrangement is shown in FIG. 2. It can be seen that the pitch attitude $\theta$ provides an undulating motion. The bucket position or mass position Z also provides a vertical motion that is quite extensive and the center or cab position of the vehicle has a lesser vertical motion Y.

In accordance with the invention, one ore more sensors S (FIGS. 1, 8) are provided at the center of gravity to produce signals. In a preferred arrangement, an angular rate sensor and an accelerometer are provided. Since the center of gravity shifts somewhat with movement and load weight, the approximate center of gravity location is used.

Figure 3:
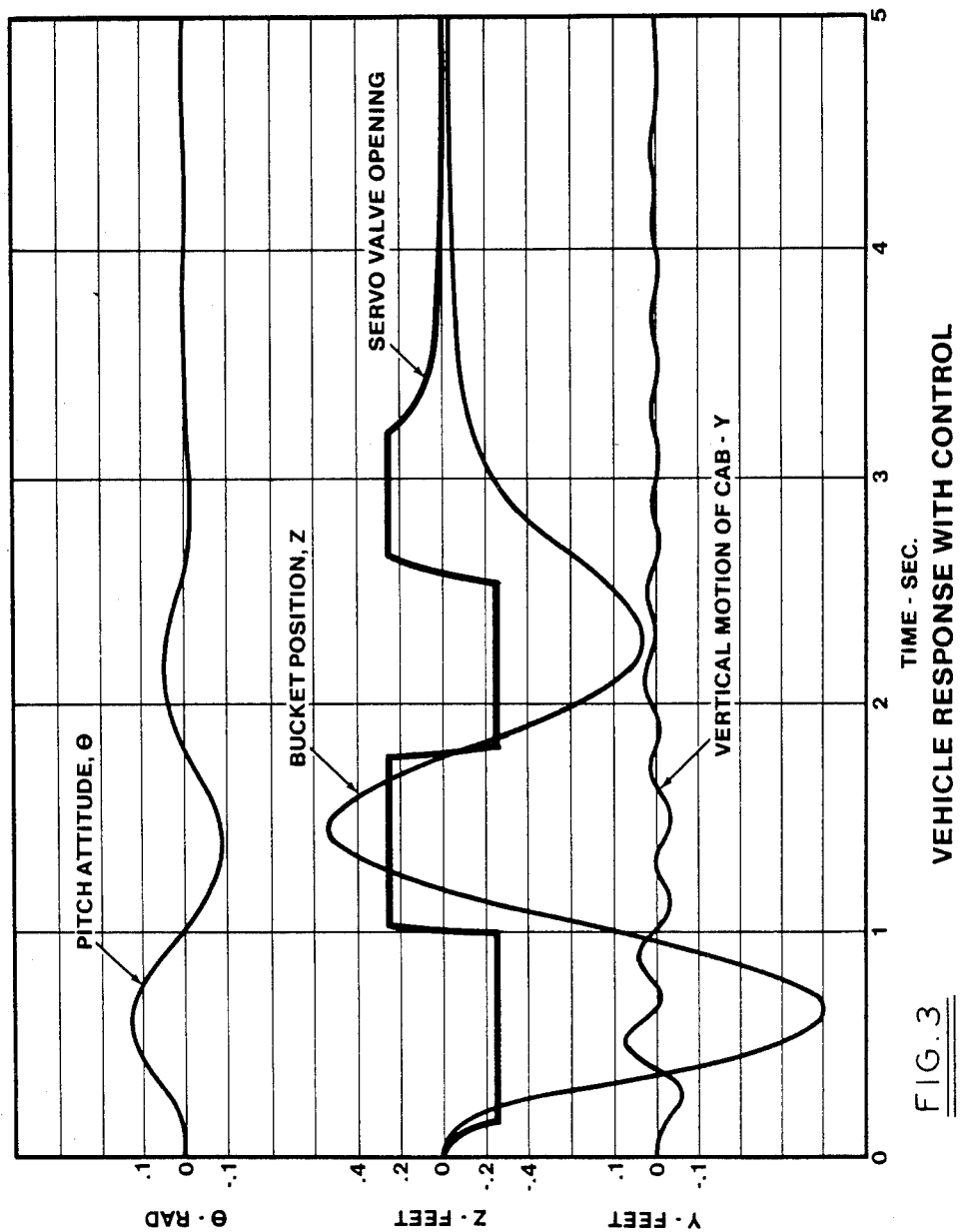
FIG. 3 is a graph of vertical motion versus vehicle response in a system utilizing the invention.

Further, in accordance with the invention, the signals from the sensors are caused by a controller to produce an additional movement of the movable mass 13 in the same direction about the axis to be stabilized as the direction which the sensor is sensing motion and this results in a stabilizing action. More specifically, an added motion is provided continuously to the bucket or mass M in the same direction as it is being moved by the pitching motion of the vehicle. The stabilizing action is diagrammatically shown in FIG. 3 wherein it can be shown that the pitch attitude $\theta$ stabilizes, the bucket or mass position Z also stabilizes, and the vertical motion Y of the center or cab position of the vehicle stabilizes.

The controller of the signal to operate the coils 19 may be either by an analog circuit or a digital circuit. Where more than one sensor is utilized, the signals are summed or added to produce a composite signal for controlling the valve 16. The summer includes a gain control for adjusting the magnitude of the signal fed to the servo valve to provide proper control of the signal to prevent over control or overshoot and to provide sufficient signal for proper control.

Referring to FIG. 1, the analog system is shown as merely including an amplifier.

Figure 5:
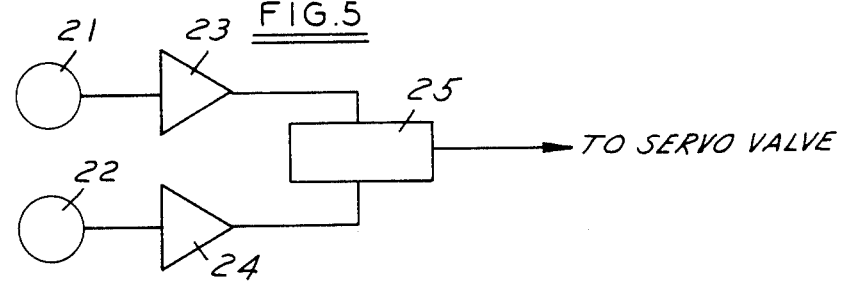
FIG. 5 is a block diagram of the analog type stabilizing system.

The manner in which the signals from two sensors are summed is shown in FIG. 5 wherein the sensors 21, 22 have their signals amplified by amplifiers 23, 24 and then added algebraically in a summer 25 to produce a signal to the electrical control. The summer 25 includes the gain control for the reasons recited above.

Figure 4:
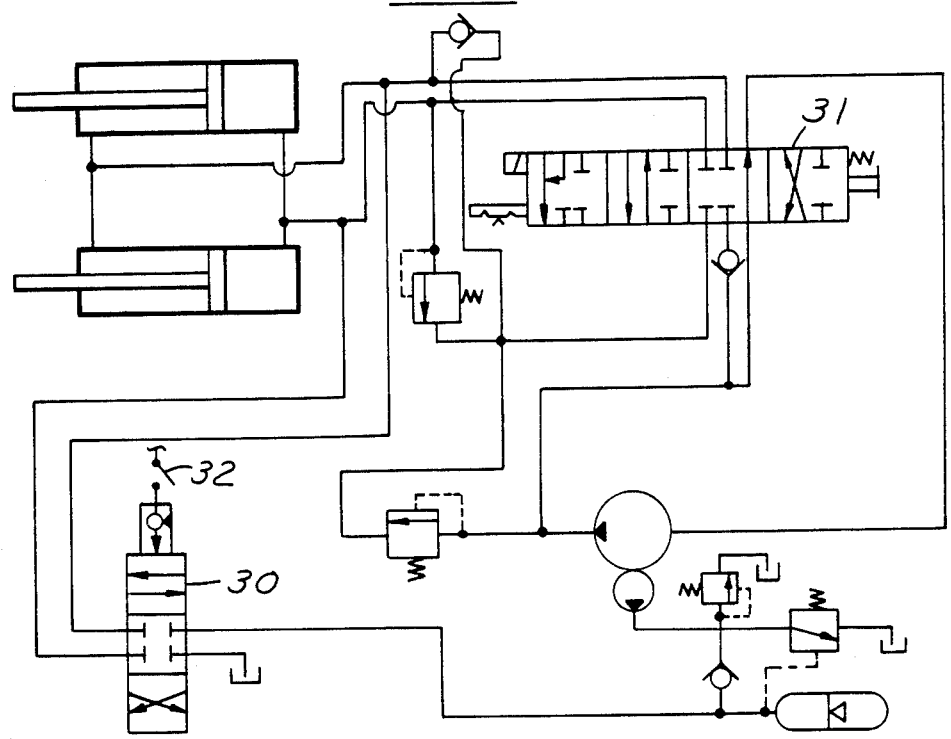
FIG. 4 is a hydraulic diagram which may be utilized in the stabilizing system.

In a preferred arrangement of a hydraulic circuit as shown in FIG. 4, a second electro hydraulic servo valve 30 is utilized for the stabilizing function in parallel with the conventional servo valve 31 that controls the normal tilting of the mass relative to the vehicle. The second servo valve 30 is connected parallel to the conventional valve 31, which normally controls the boom. Valve 31 is controlled manually or can be controlled electrically or otherwise. Servo valve 31 receives the signal from the stabilizing system to move the boom in a direction to provide the added movement of the mass in order to provide the desired stabilizing action. A switch 32 is provided in order that the operator can disconnect the stabilizing system when desired.

Figure 6:
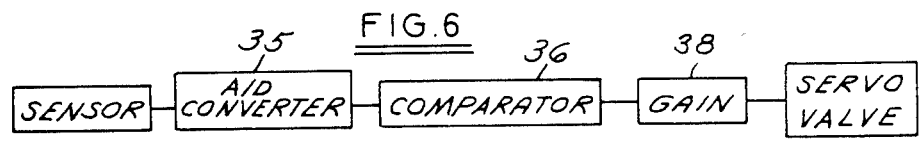
FIG. 6 is a schematic diagram of a digital electrical system utilized in a modified form of stabilizing system.

Referring to FIG. 6 in the digital type controller, the signal from the sensor is converted from an analog signal to a digital signal by the analog to digital converter 35 and then passes to a comparator 36 which functions to compare the pulses to a base value, which may be zero, and to provide the signals to the coil of the servo valve 17 through gain control 38.

Figure 7:
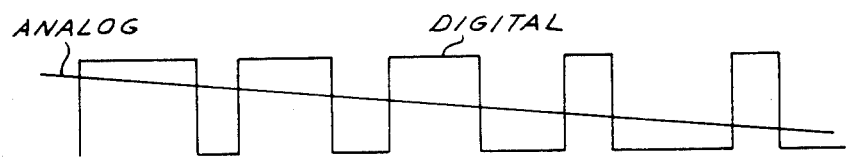
FIG. 7 is a graph of the signals obtained by the digital circuit.

As shown in FIG. 7, the analog signal is converted by the digital system to a plurality of pulses, the duty cycle or period of which is fixed but wherein the ratio of the positive or high voltage to the low voltage in each cycle varies as the magnitude of the sensor signal. When these digital pulses are applied to the coil of the servo valve, they function to actuate the servo valve in proportion to the magnitude of the error signal. The servo valve solenoid coil inductance integrates the duty-cycle time signal so that the average coil current is proportional to the average duty-cycle. The hydraulic fluid flow behaves exactly the same for an analog voltage induced current or for a digital duty-cycle induced current; both are continuously proportional through the operating range.

Where two sensors are utilized, the signal from each sensor is converted to a digital signal and the signals are summed by a summer before passing to the servo valve. Gain controls 38 are provided to control the sensitivity of the system.

Figure 8:
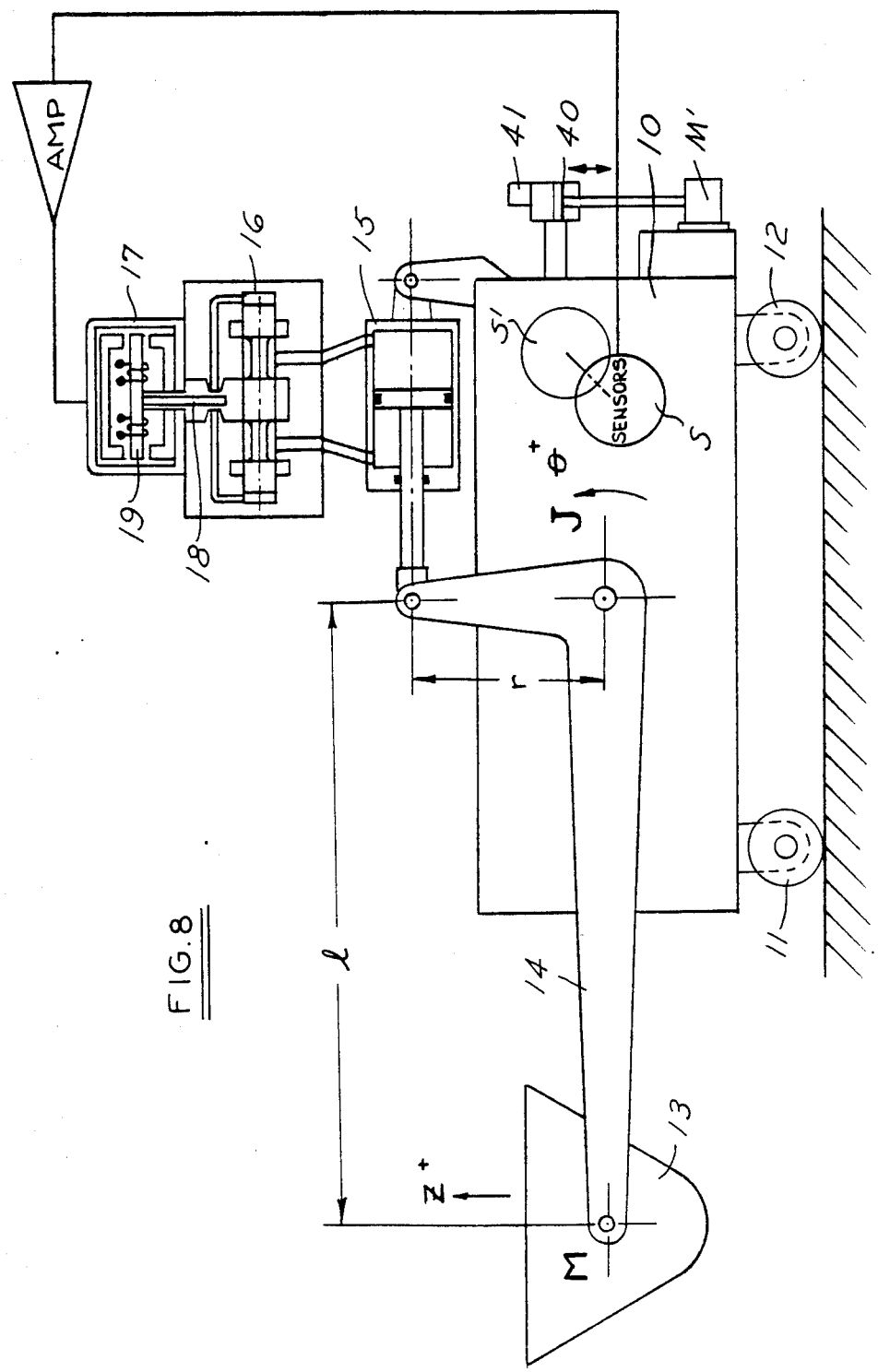
FIG. 8 is a schematic diagram of a modified form of system.

In the form of the invention shown in FIG. 8, an additional mass M' is provided on the rear of the vehicle and is movable vertically by a linear hydraulic actuator 40 controlled by a servo valve 41. A second sensor S' senses movement about the same axis and functions to provide an added movement to the mass M' in the same direction about the axis to be stabilized as the direction which the sensor is sensing movement of the vehicle. The signals from the two sensors S, S' can be summed to produce a single control signal for each servo valve 17, 41 to the cylinders 16, 40 or each cylinder may have its own circuit with separate gain controls to control the sensitivity and degree of movement.

What is claimed is:

1. A stabilizing system for wheeled vehicles comprising
    a wheeled upsprung vehicle,
    a movable mass on the vehicle forming part of an implement and spaced longitudinally from a transverse axis of the vehicle,
    an actuator mounted on the vehicle and connected to the mass for moving the mass,
    electrical sensor means mounted on the vehicle for continuously sensing angular rate of pitching movement of the vehicle about said transverse axis about which angular movement is to be stabilized,
    and electrical means responsive to said sensor means for controlling the actuator to cause movement of the movable mass in the same direction as the direction which the sensor means is sensing pitching movement of the vehicle and, in turn, the mass.

2. The stabilizing system set forth in claim 1 including second electrical sensor means comprising an accelerometer for sensing the rate of acceleration of pitching movement.

3. The stabilizing system set forth in claim 1 wherein said actuator comprises a hydraulic motor.

4. The stabilizing system set forth in claim 1, 2 or 3 wherein said electrical means responsive to said sensor means comprises an analog circuit.

5. The stabilizing system set forth in claim 1, 2, 3 or 4 wherein said electrical means responsive to said sensor means comprises a digital circuit.

6. The stabilizing system set forth in claim 1 including
    a second movable mass on the vehicle,
    a second actuator mounted on the vehicle and connected to the mass for moving the mass,
    additional electrical sensor means mounted on the vehicle for sensing angular rate of pitching movement of the vehicle about the transverse axis about which angular movement is to be stabilized,
    and electrical means responsive to said additional sensor means for controlling the second actuator to cause movement of the movable mass in the same direction as the direction which the second sensor means is sensing pitching movement of the vehicle and, in turn, the second mass.

7. A stabilizing system for wheeled vehicles comprising
    a wheeled vehicle,
    a movable mass in the form of an implement on the vehicle spaced longitudinally of a transverse axis of the vehicle,
    a hydraulic actuator mounted on the vehicle and connected to the mass for moving the mass,
    an electrically controlled servo valve for controlling the actuator,
    electrical sensor means mounted on the vehicle for sensing angular rate of pitching movement of the vehicle about said transverse axis about which angular movement is to be stabilized,
    and an electrical circuit responsive to said sensor means for providing a signal to the servo valve to cause movement of the movable mass in the same direction which the sensor means is sensing pitching movement of the vehicle and, in turn, the mass.

8. The stabilizing system set forth in claim 7 including second electrical sensor means comprising an accelerometer for sensing the rate of acceleration of pitching movement.

9. The stabilizing system set forth in claim 7 or 8 wherein said means responsive to said sensor means comprises an analog circuit.

10. The stabilizing system set forth in claim 7 or 8 wherein said means responsive to said sensor means comprises a digital circuit.

11. The stabilizing system set forth in claim 7 including
    a second movable mass on the vehicle spaced longitudinally from a transverse axis of the vehicle,
    a second hydraulic actuator mounted on the vehicle and connected to the mass for moving the mass,
    a second servo valve,
    additional electrical sensor means mounted on the vehicle for sensing angular rate of pitching movement of the vehicle about said transverse axis about which angular movement is to be stabilized,
    and a second electrical means responsive to said additional sensor means for providing an electrical signal to the second servo valve to cause movement of the movable mass in the same direction as the direction which the second sensor means is sensing pitching movement of the vehicle and, in turn, the mass.

12. The stabilizing system set forth in claim 7 wherein said movable mass comprises a boom pivoted to said vehicle.

13. The method of stabilizing the movement of an unsprung wheeled vehicle about a predetermined axis wherein the vehicle has a movable mass forming part of an implement spaced longitudinally from a transverse axis and an actuator for moving the mass comprising
    continuously electrically sensing the angular rate of pitching movement of the vehicle about the transverse axis,
    producing an electrical signal in response to said movement, causing said electrical signal to actuate the actuator and provide a movement of the mass in the direction in which the mass is moving due to movement of the vehicle about the axis.

14. The method set forth in claim 13 including continuously electrically sensing the rate of acceleration of the pitching movement about said axis.

15. The method set forth in claim 14 which comprises linearly summing the electrical signals of angular rate of pitching movement and acceleration of pitching movement and providing a movement of the mass relative to the vehicle which is related to the linear sum of said signals.

* * * * *